(12) United States Patent
Watfa et al.

(10) Patent No.: US 10,032,185 B2
(45) Date of Patent: Jul. 24, 2018

(54) AUTOMATING PRICE GUARANTEES

(71) Applicant: Yahoo! Inc., Sunnyvale, CA (US)

(72) Inventors: Allie K. Watfa, Urbana, IL (US); Dale Nussel, Mahomet, IL (US); Mangesh Pardeshi, Champaign, IL (US); Jonathan Kilroy, Champaign, IL (US)

(73) Assignee: Excalibur IP, LLC, New York, NY (US)

( * ) Notice: Subject to any disclaimer, the term of this patent is extended or adjusted under 35 U.S.C. 154(b) by 512 days.

(21) Appl. No.: 13/891,904

(22) Filed: May 10, 2013

(65) Prior Publication Data

US 2014/0337116 A1    Nov. 13, 2014

(51) Int. Cl.
*G06Q 30/00* (2012.01)
*G06Q 30/02* (2012.01)

(52) U.S. Cl.
CPC .............................. *G06Q 30/0234* (2013.01)

(58) Field of Classification Search
None
See application file for complete search history.

(56) References Cited

U.S. PATENT DOCUMENTS

| | | | | |
|---|---|---|---|---|
| 5,978,813 A * | 11/1999 | Foltz | ................ | G06F 17/30067 |
| 6,018,770 A * | 1/2000 | Little | ................ | H04L 12/6418 |
| | | | | 709/223 |
| 6,029,139 A * | 2/2000 | Cunningham | ......... | G06Q 10/06 |
| | | | | 705/14.43 |
| 7,711,600 B1 * | 5/2010 | Curran | ................ | G06Q 10/087 |
| | | | | 705/16 |
| 8,006,900 B2 * | 8/2011 | Grigsby et al. | ................ | 235/383 |
| 9,659,301 B1 * | 5/2017 | Briggs | ................ | H04W 4/70 |
| 2001/0034775 A1 * | 10/2001 | Minowa | ................ | G06Q 20/387 |
| | | | | 709/218 |
| 2002/0138399 A1 * | 9/2002 | Hayes | ................ | G06Q 40/04 |
| | | | | 705/37 |
| 2003/0036979 A1 * | 2/2003 | Tokorotani | ............ | G06Q 30/02 |
| | | | | 705/26.1 |
| 2003/0083955 A1 * | 5/2003 | Ookura | ................ | G06Q 30/02 |
| | | | | 705/26.1 |
| 2003/0212595 A1 * | 11/2003 | Antonucci | ............ | G06Q 30/02 |
| | | | | 705/14.27 |
| 2004/0006506 A1 * | 1/2004 | Hoang | ................ | G06Q 10/10 |
| | | | | 705/14.65 |

(Continued)

OTHER PUBLICATIONS

Commodity, Dictionary.com, available at http://dictionary.reference.com/browse/commodity (retrieved Jul. 22, 2015).*

(Continued)

*Primary Examiner* — Matthew T Sittner
(74) *Attorney, Agent, or Firm* — Mauriel Kapouytian Woods LLP; Elaine K. Lee; James J. Woods

(57) ABSTRACT

Techniques are provided in which the current price of a commodity purchased from a seller by a buyer with a price guarantee policy is monitored. Upon detection of the current price dropping below the purchase price, the buyer and seller are notified, leading to a rebate being provided to the buyer from the seller to be redeemed based on the terms of the price guarantee policy. In some embodiments, buyers are offered incentives, such as a discounted price, in exchange for a reduced time period within which a price guarantee policy is redeemable.

16 Claims, 5 Drawing Sheets

(56) References Cited

U.S. PATENT DOCUMENTS

| | | | | |
|---|---|---|---|---|
| 2004/0041022 A1* | 3/2004 | Minowa | G06Q 30/02 | 235/383 |
| 2004/0230659 A1* | 11/2004 | Chase | H04L 12/581 | 709/206 |
| 2005/0033689 A1* | 2/2005 | Bonalle | G06Q 20/00 | 705/40 |
| 2005/0114211 A1* | 5/2005 | Amjadi | G06Q 30/02 | 705/14.26 |
| 2005/0284933 A1* | 12/2005 | McGill | G06Q 30/06 | 235/383 |
| 2006/0059185 A1* | 3/2006 | Bocking | G06F 17/30994 | |
| 2006/0178980 A1* | 8/2006 | Goldberg | G06Q 30/06 | 705/37 |
| 2007/0265914 A1* | 11/2007 | McClung, III | G06Q 30/0211 | 705/14.14 |
| 2008/0005263 A1* | 1/2008 | Baraev | H04L 29/12122 | 709/217 |
| 2008/0056481 A1* | 3/2008 | Scott | H04L 29/12122 | 379/355.03 |
| 2008/0221982 A1* | 9/2008 | Harkins | G06Q 30/02 | 705/14.48 |
| 2008/0222004 A1* | 9/2008 | Pollock | G06Q 30/0603 | 705/15 |
| 2008/0243592 A1* | 10/2008 | Song | G06Q 30/02 | 705/14.71 |
| 2009/0106079 A1* | 4/2009 | Gutlapalli et al. | | 705/9 |
| 2009/0131121 A1* | 5/2009 | Ida | G06Q 30/02 | 455/572 |
| 2009/0138365 A1* | 5/2009 | Mueller | G06Q 20/12 | 705/14.19 |
| 2009/0198803 A1* | 8/2009 | Meckenstock | G06Q 20/20 | 709/221 |
| 2009/0248711 A1* | 10/2009 | Martinez | G06F 17/30067 | |
| 2009/0248738 A1* | 10/2009 | Martinez | G06F 17/30702 | |
| 2009/0271290 A1* | 10/2009 | Van Luchene | G06Q 20/10 | 705/26.1 |
| 2009/0307070 A1* | 12/2009 | Logie | G06Q 30/0213 | 705/14.15 |
| 2010/0287069 A1* | 11/2010 | Hudak | G06Q 20/10 | 705/26.81 |
| 2010/0319002 A1* | 12/2010 | Gosain | G06F 17/30893 | 719/311 |
| 2010/0332401 A1* | 12/2010 | Prahlad | G06F 17/30082 | 705/80 |
| 2011/0029339 A1* | 2/2011 | Callahan | G06Q 10/10 | 705/7.29 |
| 2011/0047023 A1* | 2/2011 | Lieblang | G06Q 30/02 | 705/14.36 |
| 2011/0060691 A1* | 3/2011 | Grossman | G06Q 20/20 | 705/80 |
| 2011/0225044 A1* | 9/2011 | Duffy | G06Q 30/00 | 705/14.53 |
| 2011/0252031 A1* | 10/2011 | Blumenthal | G06F 17/30864 | 707/733 |
| 2011/0258054 A1* | 10/2011 | Pandey | G06F 17/2795 | 705/14.72 |
| 2012/0022930 A1* | 1/2012 | Brouhard | G06Q 30/02 | 705/14.22 |
| 2012/0084166 A1* | 4/2012 | Van Luchene | G06Q 20/10 | 705/26.2 |
| 2012/0123864 A1* | 5/2012 | Mueller | G06Q 20/12 | 705/14.53 |
| 2012/0173620 A1* | 7/2012 | Holostov | H04L 67/1048 | 709/204 |
| 2012/0191509 A1* | 7/2012 | McMurtrie | G06Q 30/02 | 705/7.36 |
| 2012/0259686 A1* | 10/2012 | Yurow | G06Q 30/0207 | 705/14.17 |
| 2012/0259698 A1* | 10/2012 | Yurow | G06Q 20/32 | 705/14.51 |
| 2012/0265601 A1* | 10/2012 | Yang | G06Q 30/0207 | 705/14.38 |
| 2012/0310720 A1* | 12/2012 | Balsan | G06Q 20/204 | 705/14.26 |
| 2012/0323663 A1* | 12/2012 | Leach | G06Q 30/0239 | 705/14.25 |
| 2013/0006800 A1* | 1/2013 | Goldberg | G06Q 30/06 | 705/26.3 |
| 2013/0054474 A1* | 2/2013 | Yeager | G06Q 20/3223 | 705/71 |
| 2013/0073386 A1* | 3/2013 | Rose | G06Q 40/00 | 705/14.53 |
| 2013/0097001 A1* | 4/2013 | Dyor | G06Q 30/02 | 705/14.25 |
| 2013/0117090 A1* | 5/2013 | Priest | G06Q 30/02 | 705/14.26 |
| 2014/0067529 A1* | 3/2014 | Blake | G06Q 30/02 | 705/14.51 |
| 2014/0337116 A1* | 11/2014 | Watfa | G06Q 30/0234 | 705/14.34 |

OTHER PUBLICATIONS

Commodity in Dictionary of Business Terms 118 (2000).*
These Websites Give You a Refund if Your Travel Booking Drops in Price, available at http://www.airfarewatchdog.com/blog/10846530/thesewebsites-give-you-refund-if-your-travel-booking-drops-in-price/ (Mar. 21, 2012).*
Mortin Hviid, Summary of Literature on Price Guarantees (Jul. 2010), available at https://web.archive.org/web/*/http://www.uea.ac.uk/polopoly_fs/1.170059!Summary%20of%20LPG%20literature%20Final.pdf.*
Gregory Karp of the Morning Call, Price go down? Get your refund (Jan. 2008), available at https://web.archive.org/web/*/http://articles.mcall.com/2008-01-06/business/3948505_1_refund-price-protection-price-protection-policies.*
PriceProtectr Just Saved My Girlfriend $100 (Dec. 2007), available at https://web.archive.org/web/*/http://www.consumerismcommentary.com/priceprotectr-just-saved-my-girlfriend-100/.*
Website refundplease.com (as it appeared in Feb. 2009), available at https://web.archive.org/web/20090202182330/http://refundplease.com/.*

* cited by examiner

AUTOMATING PRICE GUARANTEES

BACKGROUND

In the face of the increase in use of the Internet to shop rather than using traditional brick-and-mortar retailers, and the ensuing ease of comparison shopping based on price that the Internet has made available to consumers, more and more brick-and-mortar retailers have begun offering price guarantee to consumers who purchase from them. Typically this price guarantee is made in the form of a guarantee that if the user finds a competitor selling the same item for less money during a specified time window (generally, 30, 60, or 90 days), that the retailer will refund the difference between the actual amount the consumer paid originally and the price he or she could obtain from a competitor. Not only does this give the consumer confidence in making the initial purchase from the brick-and-mortar retailer, but it also helps reduce returns, which can be costly for brick-and-mortar retailers.

In addition to protecting the consumer in cases where a competitor offers a product for less money within the specified time period, the price guarantee generally also extends to the retailers own prices, in that should the retailer drop the price or offer a sale on the product within the specified time period, the consumer is also able to obtain a refund.

This type of price guarantee, however, is rarely taken advantage of by the consumer. Most consumers do not have the time or simply forget to track a retailer's price of a product, and even less time to bring the receipt back to the retailer and obtain a refund within the specified time period. As such, a large number of potential refunds go unredeemed.

There is a need for better techniques for keeping track of all the product purchase and track how these product price matched with other web sites and retailers

SUMMARY

Some embodiments of the invention provide techniques that include monitor the current price of a commodity purchased by a buyer with a price guarantee policy. Upon detection of the current price dropping below the purchase price, the buyer and seller are notified, leading to a rebate being provided to the buyer from the seller to be redeemed based on the terms of the price guarantee policy.

In some embodiments, techniques are provided to offer buyers an incentive, such as a discounted price, in exchange for a reduced time period within which a price guarantee policy is redeemable. In some embodiments, techniques are provided to periodically search for current prices of the purchased commodity in a given time period rather than at a single one point in time.

While the invention is described with reference to the above drawings, the drawings are intended to be illustrative, and the invention contemplates other embodiments within the spirit of the invention.

DETAILED DESCRIPTION

Figure 1:
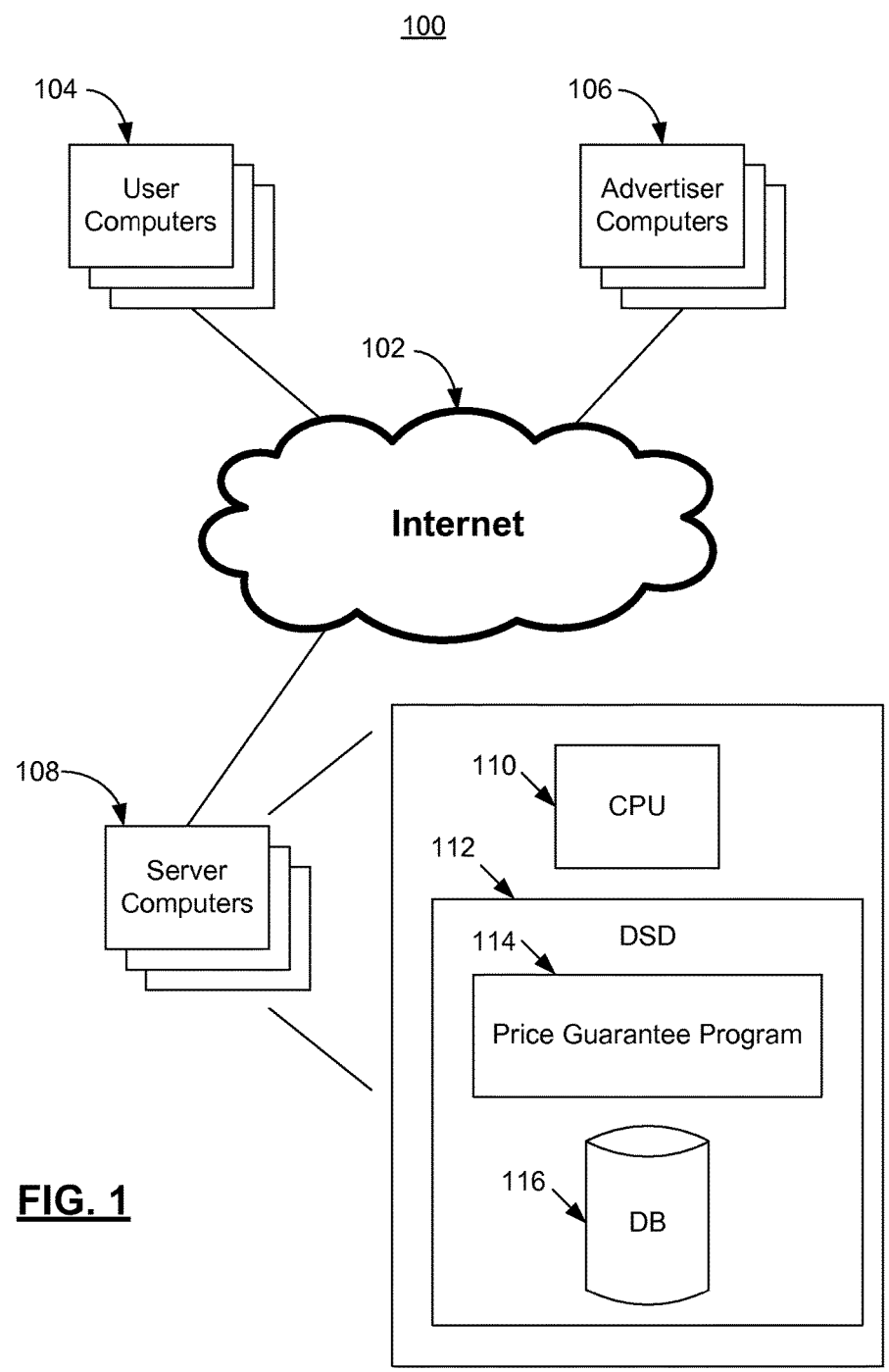
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Price Guarantee Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Various monetization techniques or models may be used in connection with advertising, such as sponsored search advertising, including advertising associated with user search queries, and non-sponsored search advertising, including graphical or display advertising. In an auction-based online advertising marketplace, advertisers may bid in connection with placement of advertisements, although many other factors may also be included in determining advertisement selection or ranking Bids may be associated with amounts the advertisers pay for certain specified occurrences, such as for placed or clicked-on advertisements, for example.

Advertiser payment for online advertising may be divided between parties including one or more publishers or publisher networks, and one or more marketplace facilitators or providers, potentially among other parties. Some models include guaranteed delivery advertising, in which advertisers may pay based on an agreement guaranteeing or providing some measure of assurance that the advertiser will receive a certain agreed upon amount of suitable advertising, and non-guaranteed delivery advertising, which may be individual serving opportunity-based or spot market-based. In various models, advertisers may pay based on any of various metrics associated with advertisement delivery or performance, or associated with measurement or approximation of a particular advertiser goal. For example, models can include, among other things, payment based on cost per impression or number of impressions, cost per click or number of clicks, cost per action for some specified action, cost per conversion or purchase, or cost based on some combination of metrics, which can include online or offline metrics. In some embodiments of the invention, payment may be based on assessed favorable branding or brand engagement value, for example.

Figure 2:
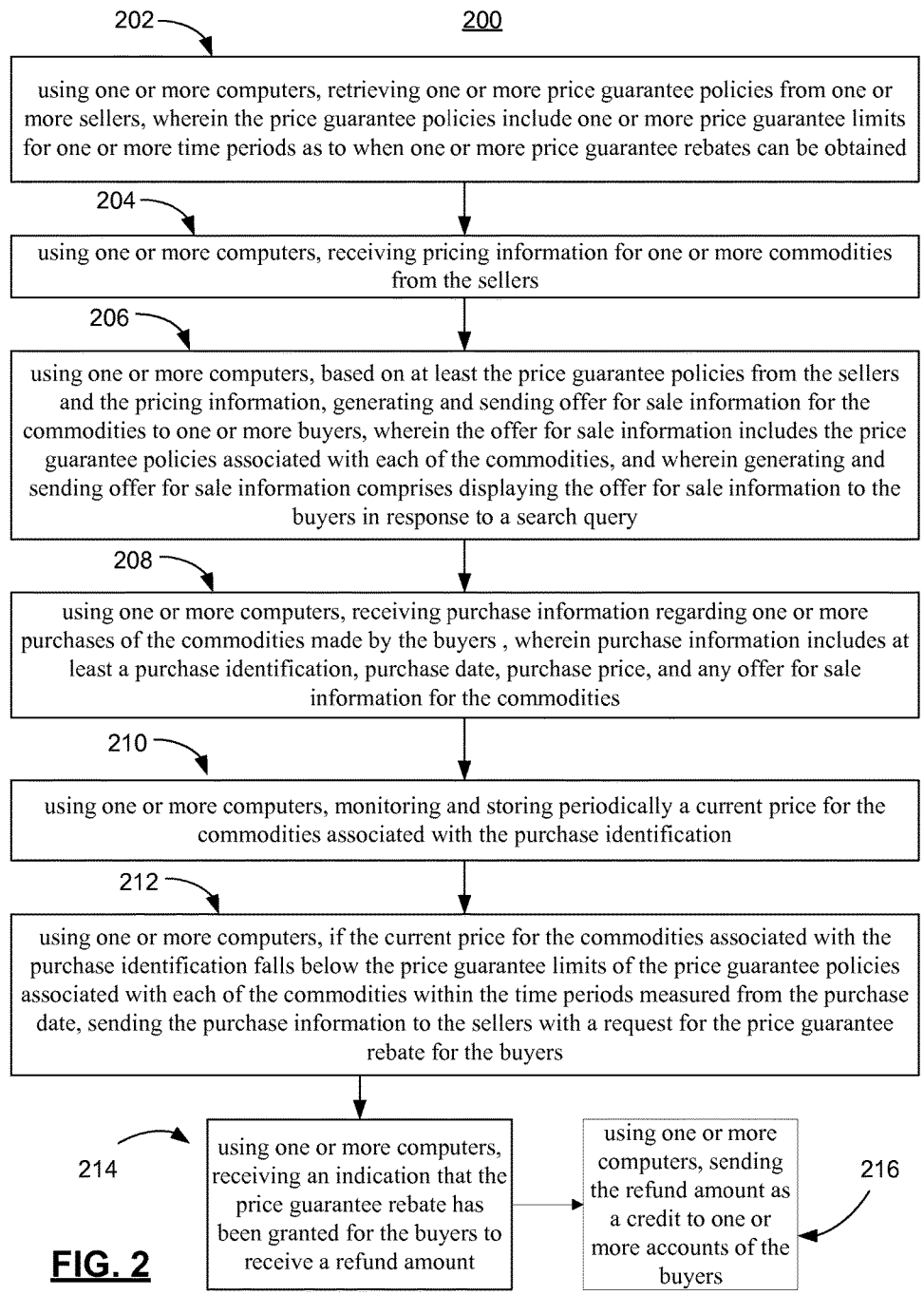
FIG. 2 is a flow diagram illustrating a method according to one embodiment of the invention.

FIG. 2 is a flow diagram illustrating a method 200 according to one embodiment of the invention. At step 202, using one or more computers, one or more price guarantee policies are retrieved from one or more sellers, wherein the price guarantee policies include one or more price guarantee limits for one or more time periods as to when one or more price guarantee rebates can be obtained. At step 204, using one or more computers, pricing information is received for one or more commodities from the sellers.

At step 206, using one or more computers, based on at least the price guarantee policies from the sellers and the pricing information, offer for sale information for the commodities is generated and sent to one or more buyers, wherein the offer for sale information includes the price guarantee policies associated with each of the commodities, and wherein generating and sending offer for sale information comprises displaying the offer for sale information to the buyers in response to a search query. At step 208, using one or more computers, purchase information regarding one or more purchases of the commodities made by the buyers is received, wherein purchase information includes at least a purchase identification, purchase date, purchase price, and any offer for sale information for the commodities.

At step 210, using one or more computers, a current price for the commodities associated with the purchase identification is monitored and stored periodically. At step 212, using one or more computers, if the current price for the commodities associated with the purchase identification falls below the price guarantee limits of the price guarantee policies associated with each of the commodities within the time periods measured from the purchase date, the purchase information is sent to the sellers with a request for the price guarantee rebate for the buyers. At step 214, using one or more computers, an indication that the price guarantee rebate has been granted for the buyers to receive a refund amount is received. At step 216, using one or more computers, the refund amount is sent as a credit to one or more accounts of the buyers.

Figure 3:
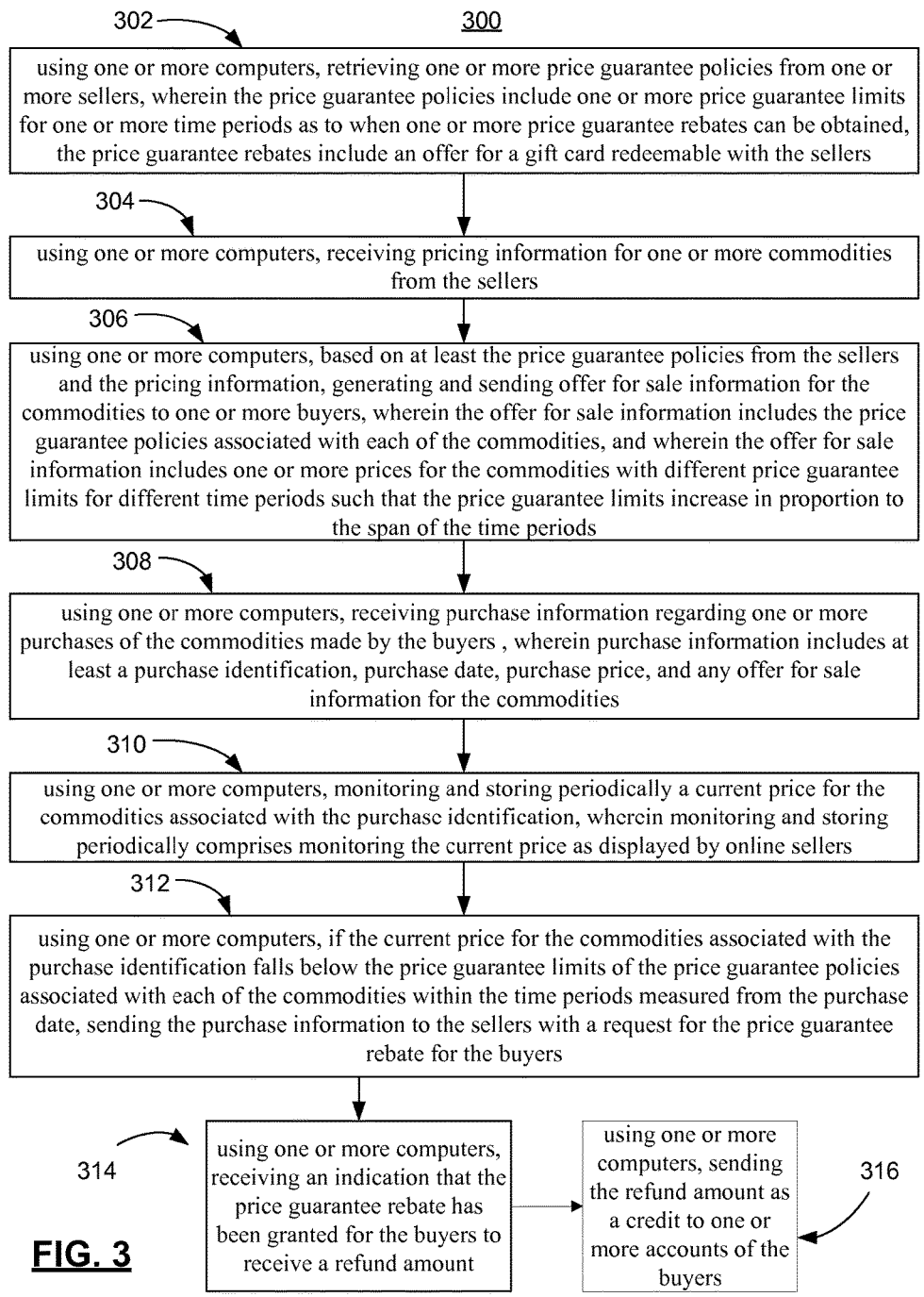
FIG. 3 is a flow diagram illustrating a method according to one embodiment of the invention.

FIG. 3 is a flow diagram illustrating a method 300 according to one embodiment of the invention. At step 302, using one or more computers, one or more price guarantee policies are retrieved from one or more sellers, wherein the price guarantee policies include one or more price guarantee limits for one or more time periods as to when one or more price guarantee rebates can be obtained, where the price guarantee rebates include an offer for a gift card redeemable with the sellers. At step 304, using one or more computers, pricing information is received for one or more commodities from the sellers.

At step 306, using one or more computers, based on at least the price guarantee policies from the sellers and the pricing information, offer for sale information for the commodities is generated and sent to one or more buyers, wherein the offer for sale information includes the price guarantee policies associated with each of the commodities, and wherein the offer for sale information includes one or more prices for the commodities with different price guarantee limits for different time periods such that the price guarantee limits increase in proportion to the span of the time periods. At step 308, using one or more computers, purchase information regarding one or more purchases of the commodities made by the buyers is received, wherein purchase information includes at least a purchase identification, purchase date, purchase price, and any offer for sale information for the commodities.

At step 310, using one or more computers, a current price for the commodities associated with the purchase identification is monitored and stored periodically, wherein monitoring and storing periodically comprises monitoring the current price as displayed by online sellers. At step 312, using one or more computers, if the current price for the commodities associated with the purchase identification falls below the price guarantee limits of the price guarantee policies associated with each of the commodities within the time periods measured from the purchase date, the purchase information is sent to the sellers with a request for the price guarantee rebate for the buyers. At step 314, using one or more computers, an indication that the price guarantee rebate has been granted for the buyers to receive a refund amount is received. At step 316, using one or more computers, the refund amount is sent as a credit to one or more accounts of the buyers.

Figure 4:
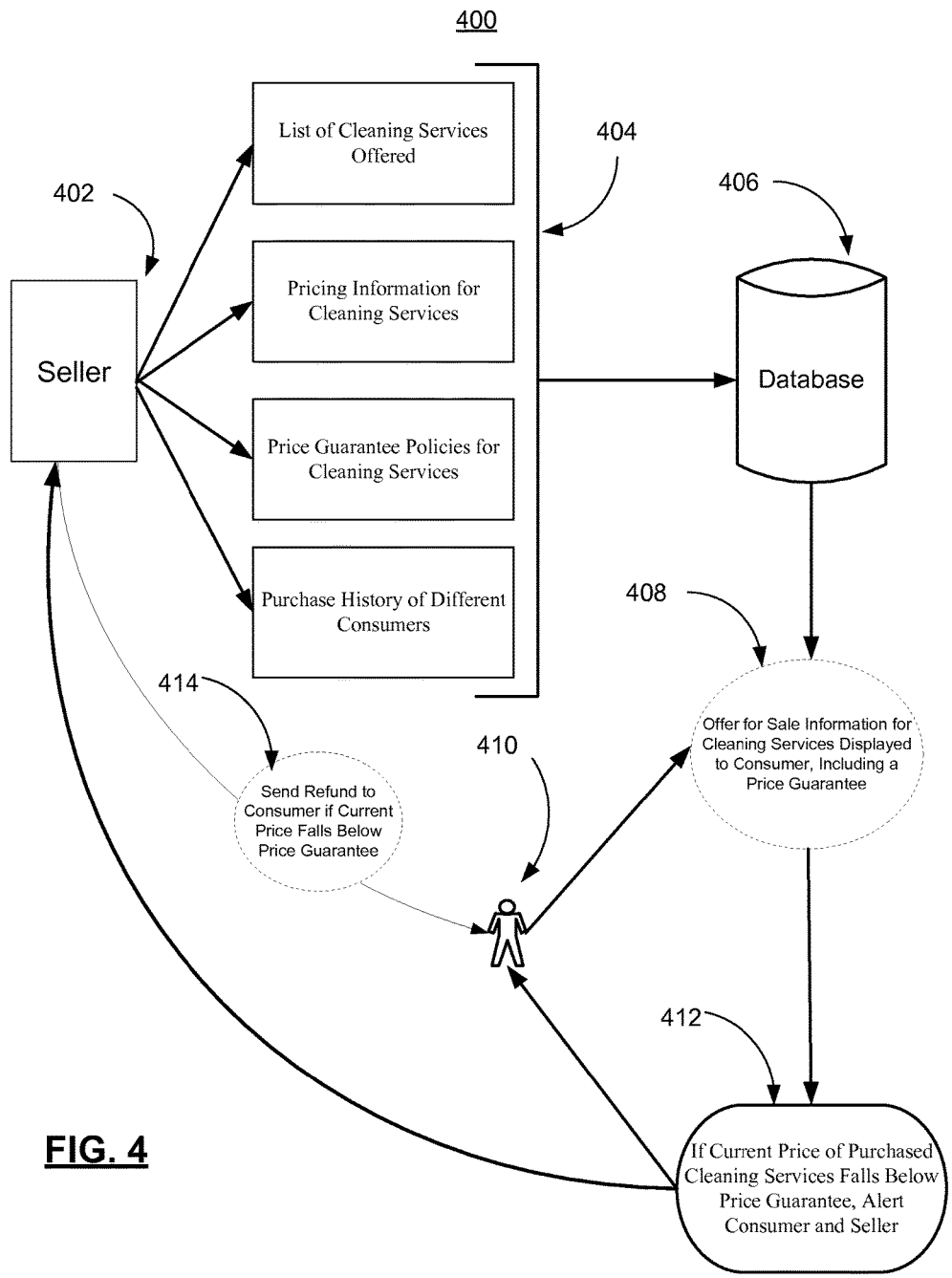
FIG. 4 is a block diagram illustrating one embodiment of the invention.

FIG. 4 is a block diagram illustrating one embodiment of the invention. Various types of information are stored by a seller 402 in one or more information folders, represented by Block 404. In the present embodiment, the seller 402 has stored in information folders 404, among other things, a list of cleaning services offered; pricing information for the cleaning services; price guarantee policies for the cleaning services; and purchase history of different consumers. This information is sent to a database 406 for use in generating offer for sale information for the cleaning services offered by the seller 402 with a price guarantee and, subsequently displaying them to a potential consumer 410, as represented by Block 408. In some embodiments, displaying the offer for sale information includes, but is not limited to, displaying on a website for the seller, a third-party website visited by the consumer 410, e-mail, social network message, mobile device display, and short message service (SMS).

As shown in Block 412, based on the consumer 410 making a purchase based on the offer for sale information 408, current prices are monitored such that if the current price for the purchase made by the consumer 410 falls below the price guarantee, the seller 402 and the consumer 410 are both alerted. In the present embodiment, if the price for the cleaning services purchased by the consumer 410 falls below the price guarantee, the seller 402 and consumer 410 are both alerted. Based on this event, a refund is sent to the consumer 410 by the seller 402 based on the current price of the purchased cleaning service falling below the price guarantee, as shown in Block 414.

Figure 5:
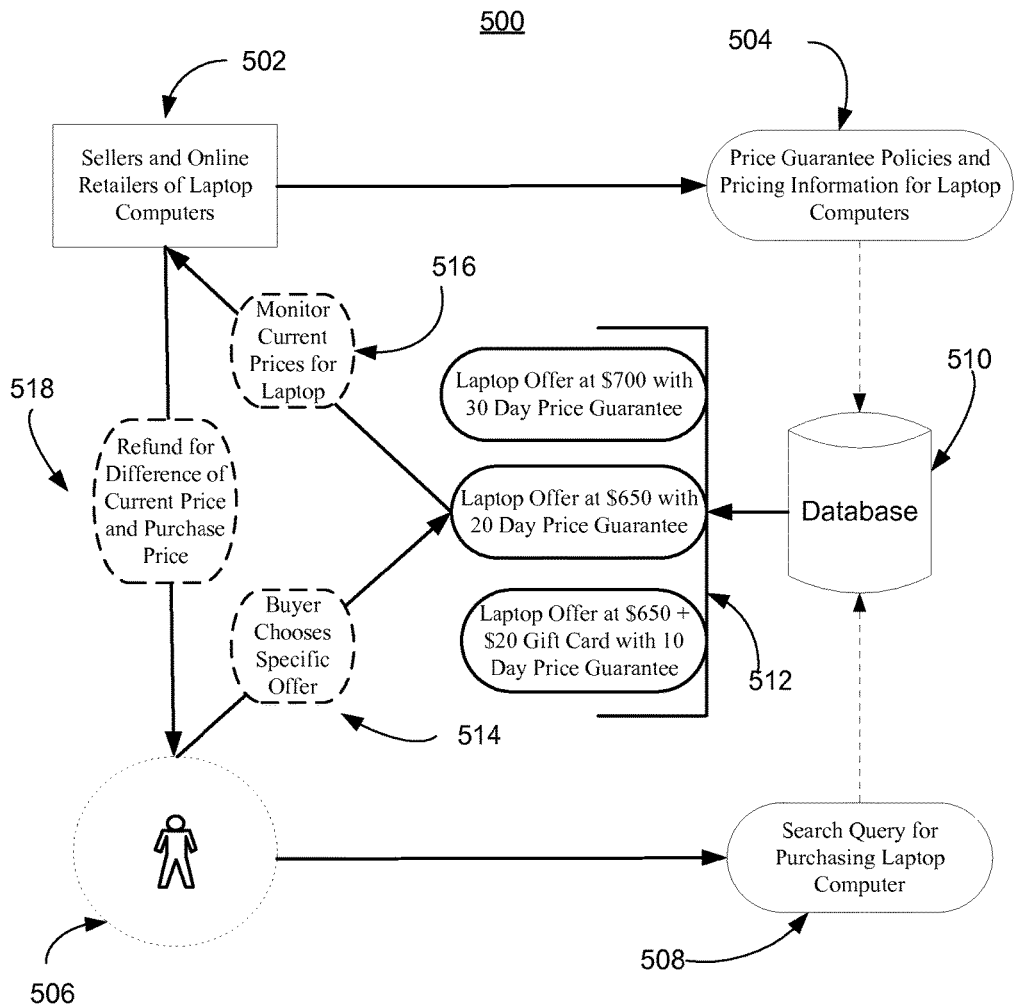
FIG. 5 is a block diagram illustrating one embodiment of the invention.

FIG. 5 is a block diagram illustrating one embodiment of the invention. Various sellers and online retailers 502 have price guarantee policies and pricing information, represented by Block 504, related to commodities they are selling available for the online community to obtain. For example, in the present embodiment, sellers and online retailers 502 of laptop computers have created price guarantee policies related to their inventory of laptop computers 504. By the same token, buyers are, at any given time, searching for particular items they are interested in purchasing. In the present example, a buyer 506 is entering a search query into an online search engine to search for a laptop computer he/she is interested in purchasing, represented by Block 508. In the present embodiment, both the price guarantee policies and pricing information of the laptop sellers and online retailers (Block 504) and the online search query of a potential laptop buyer (Block 508) are sent to and gathered by a common database 510.

Based on the information received by the database 510, a set of offers is generated for the seller's products and/or services and presented to the potential buyer with different incentives. For example, as represented by Block 512, three different offers for the buyer 506 to purchase the laptop searched for (Block 508) are presented based on the price guarantee policies and pricing information (Block 504) given by the seller 502. The buyer 506 can either: (a) purchase the laptop at $700 with a 30 day price guarantee; (b) purchase the laptop at $650 with a 20 day price guarantee; or (c) purchase the laptop at $650 with a $20 gift card and 10 day price guarantee, as represented by Block 512. In effect, the buyer 504 is presented with a lower price for foregoing a lengthier time period within which to potentially redeem a price guarantee policy by the sellers and online retailers 502.

Based on the option among the set of offers (Block 512) purchased by the buyer 502, the current price for the purchased item is monitored based on the prices presented by sellers and online retailers 502 and, if the current price falls below the price guarantee associated with the purchase within the specified time period, the seller 502 will refund the difference in price directly to the buyer 506. In the present embodiment, the buyer 506 chooses to purchase the laptop at $650 with a 20 day price guarantee among the set of options shown by Block 512. Accordingly, the current price for the purchased laptop is monitored amongst various sellers and online retailers 502, as represented by Block 516. If the current price for the laptop were to fall below the price guarantee within the 20 day price guarantee time period, the seller 502 would directly refund the buyer 506 an amount equal to the difference in the current price and purchase price, as represented by Block 518.

While the invention is described with reference to the above drawings, the drawings are intended to be illustrative, and the invention contemplates other embodiments within the spirit of the invention.

The invention claimed is:

1. A method comprising:

in response to an online search query from at least one buyer, retrieving from an information folder to a server, one or more price guarantee policies for one or more commodities or services from one or more sellers, wherein the price guarantee policies are included in sponsored search and non-sponsored search advertising in an auction-based online advertising marketplace, and each price guarantee policy includes a price guarantee limit for a time period when a price guarantee rebate can be obtained;

in response to the online search query from the at least one buyer, receiving pricing information for one or more commodities or services from the sellers at the server, wherein the pricing information is included in sponsored search and non-sponsored search advertising in the auction-based online advertising marketplace, and is obtained from the information folder, the server comprising a microprocessor and the database storing product and service information, pricing information, online advertising information and the price guarantee policies of the one or more sellers, and the purchase history of one or more buyers;

based on at least the purchase history, preference or query of the at least one buyer, the price guarantee policies from the sellers, the online advertising information and pricing information, generating and sending from the server over a wireless communication channel to a wireless device associated with the at least one buyer, offer for sale information from at least one seller for the commodities or services, wherein the offer for sale information is configured for display on the wireless device through at least one of a third party website visited by the buyer, the seller's website visited by the buyer, email sent to the buyer, social network message, mobile device display, and short message service, and includes price guarantee policies associated with each of the commodities or services, and wherein the server is configured to accept as user input from the wireless device only one price guarantee selection where two or more price guarantee policies are displayed on the wireless device for an identified commodity or service;

receiving and storing in the database purchase information regarding one or more purchases of the commodities or services made by the buyers, wherein purchase information includes at least a purchase identification, purchase date, purchase price for each purchased commodity or service, and at most one price guarantee selection for each purchased commodity or service;

monitoring and storing periodically in the database current prices from the sellers for the commodities or services associated with the purchase identification;

if the current price of any seller for a purchased commodity or service associated with the purchase identification falls below the price guarantee limits of the price guarantee selection associated with that commodity or service within the time periods measured from the purchase date, sending on behalf of the buyer from the server, the purchase information to the seller associated with the price guarantee selection with a request for the price guarantee rebate for the buyers;

receiving at the server, an indication from the seller associated with the price guarantee selection that the price guarantee rebate has been granted for the buyers to receive a refund amount; and sending from the server a request to issue the refund amount as a credit to one or more accounts of the buyers.

2. The method of claim 1, wherein the offer for sale information includes one or more prices for the commodities or services with different price guarantee limits for different time periods such that the offer prices increase as the span of the price guarantee time periods increases in length.

3. The method of claim 1, wherein the price guarantee rebates include an offer for a gift card redeemable with the sellers.

4. The method of claim 1, wherein monitoring and storing periodically the current price for the commodities or services associated with the purchase identification comprises monitoring the current price as displayed by online sellers.

5. The method of claim 1, wherein monitoring and storing periodically the current price for the commodities or services associated with the purchase identification comprises storing the price on virtualized pools of storage using an online network.

6. The method of claim 1, wherein monitoring and storing periodically the current price for the commodities or services associated with the purchase identification comprises ceasing monitoring and storing periodically when the time periods associated with the price protection policies expire.

7. The method of claim 1, wherein generating and sending offer for sale information for the commodities or services to one or more buyers comprises displaying the offer for sale information to the buyers on a website.

8. A system comprising:
one or more server computers coupled to a network; and
one or more databases coupled to the one or more server computers;
wherein the one or more server computers comprise a memory containing machine-readable instructions, which when executed by the processor, comprise:
in response to an online search query from the at least one buyer, retrieving from an information folder to a server, one or more price guarantee policies for one or more commodities or services from one or more sellers, wherein the price guarantee policies are included in sponsored search and non-sponsored search advertising in an auction-based online advertising marketplace, and each price guarantee policy includes a price guarantee limit for a time period when a price guarantee rebate can be obtained;
in response to the online search query from the at least one buyer, receiving pricing information for one or more commodities or services from the sellers at the server, wherein the pricing information is included in sponsored search and non-sponsored search advertising in the auction-based online advertising marketplace, and is obtained from the information folder, the server comprising a microprocessor and the database storing product and service information, pricing information, online advertising information and price guarantee policies of one or more sellers, and purchase history of one or more buyers;
based on at least the online search query of the at least one buyer, purchase history of one or more buyers, the price guarantee policies from the sellers, online advertising information and the pricing information, generating and sending from the server over a wireless communication channel to a wireless device associated with at least one buyer, offer for sale information from at least one seller for the commodities or services, wherein the offer for sale information is configured for display on the wireless device through at least one of a third party website visited by the buyer, the seller's website visited by the buyer, email sent to the buyer, social network message, mobile device display, and short message service, and includes price guarantee policies associated with each of the commodities or services, and wherein the server is configured to accept as user input from the wireless device only one price guarantee selection where two or more price guarantee policies are displayed on the wireless device for an identified commodity or service;
receiving and storing in the database purchase information regarding one or more purchases of the commodities or services made by the buyers, wherein purchase information includes at least a purchase identification, purchase date, purchase price for each purchased commodity or service, and at most one price guarantee selection for each purchased commodity or service;
monitoring and storing periodically in the database current prices from the sellers for the commodities or services associated with the purchase identification;
if the current price of any seller for a purchased commodity or service associated with the purchase identification falls below the price guarantee limits of the price guarantee selection associated with that commodity or service within the time periods measured from the purchase date, sending on behalf of the buyer from the server, the purchase information to the seller associated with the price guarantee selection with a request for the price guarantee rebate for the buyers;
receiving at the server, an indication from the seller associated with the price guarantee selection that the price guarantee rebate has been granted for the buyers to receive a refund amount; and
sending from the server a request to issue the refund amount as a credit to one or more accounts of the buyers.

9. The system of claim 8, wherein the offer for sale information includes one or more prices for the commodities or services with different price guarantee limits for different time periods such that the offer prices increase as the span of the price guarantee time periods increases in length.

10. The system of claim 8, wherein the price guarantee rebates include an offer for a gift card redeemable with the sellers.

11. The system of claim 8, wherein monitoring and storing periodically the current price for the commodities or services associated with the purchase identification comprises monitoring the current price as displayed by online sellers.

12. The system of claim 8, wherein monitoring and storing periodically the current price for the commodities or services associated with the purchase identification comprises storing the price on virtualized pools of storage using an online network.

13. The system of claim 8, wherein monitoring and storing periodically the current price for the commodities or services associated with the purchase identification comprises ceasing monitoring and storing periodically when the time periods associated with the price protection policies expire.

14. The system of claim 8, wherein generating and sending offer for sale information for the commodities or services to one or more buyers comprises displaying the offer for sale information to the buyers on a website.

15. The system of claim 8, wherein generating and sending offer for sale information for the commodities to one or more buyers comprises displaying the offer for sale information to the buyers in response to a search query.

16. A non-transitory computer readable medium or media containing machine-readable instructions, which when executed by a processor, perform a method comprising:
in response to an online search query from the at least one buyer, retrieving from an information folder to a server, one or more price guarantee policies for one or more commodities or services from one or more sellers, wherein the price guarantee policies are included in sponsored search and non-sponsored search advertising in an auction-based online advertising marketplace, and each price guarantee policy includes a price guarantee limit for a time period when a price guarantee rebate can be obtained;
in response to an online search query from the at least one buyer, receiving pricing information for one or more commodities or services from the sellers at the server, wherein the pricing information is included in sponsored search and non-sponsored search advertising in the auction-based online advertising marketplace, and is obtained from the information folder, the server comprising a microprocessor and the database storing product and service information, pricing information, price guarantee policies and online advertising information of one or more sellers, and purchase history of one or more buyers;

based on at least the online search query from the at least one buyer, the purchase history of one or more buyers, the price guarantee policies from the sellers, the online advertising information and the pricing information, generating and sending from the server over a wireless communication channel to a wireless device associated with the at least one buyer, offer for sale information from the at least one seller for the commodities or services, wherein the offer for sale information is configured for display on the wireless device through at least one of a third party website visited by the buyer, the seller's website visited by the buyer, email sent to the buyer, social network message, mobile device display, and short message service, and includes price guarantee policies associated with each of the commodities or services, and wherein generating and sending offer for sale information comprises displaying the offer for sale information to the buyers in response to a search query, and wherein the server is configured to accept as user input from the wireless device only one price guarantee selection where two or more price guarantee policies exist for an identified commodity or service, and each policy is presented as a selectable option for the buyer on the user device display;

receiving and storing in the database purchase information regarding one or more purchases of the commodities or services made by the buyers, wherein purchase information includes at least a purchase identification, purchase date, purchase price for each purchased commodity or service, and at most one price guarantee selection for each purchased commodity or service;

monitoring and storing periodically in the database current prices from the sellers for the commodities or services with the purchase identification;

if the current price of any seller for a purchased commodity or service associated with the purchase identification falls below the price guarantee limits of the price guarantee selection associated with that commodity or service within the time periods measured from the purchase date, sending on behalf of the buyer from the server, the purchase information to the seller associated with the price guarantee selection with a request for the price guarantee rebate for the buyers;

receiving at the server an indication from the seller associated with the price guarantee selection that the price guarantee rebate has been granted for the buyers to receive a refund amount; and sending from the server a request to issue the refund amount as a credit to one or more accounts of the buyers.

* * * * *